(12) United States Patent
Nasrollahzadeh

(10) Patent No.: US 11,022,507 B2
(45) Date of Patent: Jun. 1, 2021

(54) ULTRASONIC SENSOR

(71) Applicant: Masoud Nasrollahzadeh, Irvine, CA (US)

(72) Inventor: Masoud Nasrollahzadeh, Irvine, CA (US)

(73) Assignee: MASOUD NASROLLAHZADEH, Irvine, CA (US)

( * ) Notice: Subject to any disclaimer, the term of this patent is extended or adjusted under 35 U.S.C. 154(b) by 200 days.

(21) Appl. No.: 16/376,092

(22) Filed: Apr. 5, 2019

(65) Prior Publication Data
US 2020/0319041 A1    Oct. 8, 2020

(51) Int. Cl.
G01L 1/16    (2006.01)
G01L 1/25    (2006.01)

(52) U.S. Cl.
CPC .............. G01L 1/255 (2013.01); G01L 1/16 (2013.01)

(58) Field of Classification Search
CPC .......... G01L 1/255; G01L 1/16; G01L 5/0028
USPC .......................................................... 73/761
See application file for complete search history.

(56) References Cited

U.S. PATENT DOCUMENTS

| | | | | |
|---|---|---|---|---|
| 4,735,096 A * | 4/1988 | Dorr | ...................... | G10K 11/02 310/325 |
| 4,846,001 A * | 7/1989 | Kibblewhite | ....... | B25B 23/1425 73/761 |
| 6,288,476 B1 * | 9/2001 | Puskas | .................. | B06B 1/0622 310/325 |
| 6,501,211 B1 * | 12/2002 | Nasrollahzadeh | ...... | G01L 5/246 310/317 |
| 7,467,556 B2 * | 12/2008 | Kibblewhite | ........... | F16B 25/10 73/761 |
| 7,650,792 B2 * | 1/2010 | Kibblewhite | ........... | F16B 31/02 73/761 |
| 7,698,949 B2 * | 4/2010 | Akdeniz | .............. | G01N 29/043 73/649 |
| 8,521,448 B1 * | 8/2013 | Ung | ...................... | F16B 1/0071 702/42 |
| 8,683,869 B2 * | 4/2014 | Herley | .................... | F16B 31/02 73/761 |
| 9,339,926 B2 * | 5/2016 | Kibblewhite | ....... | B25B 23/0085 |
| 9,429,485 B1 * | 8/2016 | Cavallaro | ................. | G01L 1/16 |
| 2010/0275693 A1 * | 11/2010 | Zhuang | ................ | G01N 29/024 73/632 |

* cited by examiner

*Primary Examiner* — Jacques M Saint Surin

(57) ABSTRACT

An improved ultrasonic transducer for measuring stretch loads on bolts is provided. The improved ultrasonic transducer is separated into a pickup unit and a base sensor unit. The base sensor unit includes a piezo ceramic inside an aluminum can covered by a PCB for protection, which is surrounded by a strong magnet. Honey is used as a couplant between the base sensor unit and the bolt during operation. The base sensor unit stays on the bolt before and after tightening without changing the mechanical bonding between the sensor and bolt therefore achieving higher accuracy stretch readings. The base sensor unit is low cost and reusable, as it can be placed on number of bolts before tightening and can be removed after tightening, washed and then reused.

9 Claims, 5 Drawing Sheets

ULTRASONIC SENSOR

CROSS-REFERENCE TO RELATED APPLICATIONS

N/A

BACKGROUND OF THE INVENTION

1. Field of the Invention

The present invention a generally to stretch measurement devices for bolt type fasteners, more specifically an improved ultrasonic sensor.

2. Description of Related Art

For some time, ultrasonic sensors have been used to accurately measure a stretch load on bolts. Currently, ultrasonic sensors are built as an enclosed system, generally consisting of a wear plate, piezo ceramic sensor, magnet, casing, and a connector. To measure the load on a bolt, after the bolt is tighten, a process involving placing an ultrasonic sensor on a bolt using an ultrasonic couplant is used. The couplant causes ultrasonic waves to travel between the bolt and the ultrasonic sensor, such that a zero reference echo is measured. The ultrasonic sensor is then removed, so the bolt may be tightened. Once the bolt is tightened, the ultrasonic sensor is replaced on the bolt such that the stretch load on the bolt may be measured. However, the removing and replacing the ultrasonic sensor changes the distribution of the couplant as well as the location of the reference point from the end of the bolt, causing inaccurate reads of the stretch load. Consequently, an improved ultrasonic sensor is needed to overcome these differences to provide accurate, repeatable load measurements while being easy to use, removable, and inexpensive.

BRIEF SUMMARY OF THE INVENTION

It is a particular object of the present invention to provide an improved ultrasonic sensor that is easy to use, inexpensive, reusable, enabling reliable and repeatable measurements in any production or testing environment.

In order to do so, an improved ultrasonic sensor is provided, comprising a base sensor unit including a piezo ceramic sensor and a printed circuit board enclosed in a nonmagnetic housing, wherein the nonmagnetic housing is surrounded by a first cylindrical magnet; a signal pickup unit including a cylinder having a distal end and a proximal end, a cylindrical casing attached to the proximal end, a spring loaded probe surrounded by a second cylindrical magnet, wherein the spring loaded probe and the second cylindrical magnet are protected by the cylindrical casing, and the signal pickup unit is removable from the base senor unit; and, wherein the base sensor unit is configured to be removably attached to a bolt via a couplant and the single pickup unit is configured to measure a load on the bolt when the first and second cylindrical magnets are magnetically attached and the spring loaded probe engages the nonmagnetic housing.

In another aspect of the invention, a method for utilizing the improved sensor on a plurality of bolts arranged in a tray includes steps: (a) placing a drop of honey on the top of each bolt of the plurality of bolts; (b) placing a plurality of base sensor units on the plurality of bolts; (c) placing a signal pickup unit on a base sensor unit of the plurality of base sensor units to measure a zero reference of a first bolt; (d) removing the signal pickup unit from the base sensor unit; (e) tightening the first bolt with a tool; (f) removing the tool; (g) replacing the signal pickup unit on the base sensor unit to measure a load on the first bolt; (h) removing the signal pickup unit from the base sensor unit; (i) removing the base sensor unit from the bolt; and (j) washing the base sensor unit such that it can be reused. In one embodiment, a strong magnet is used in step (i) to attract to the magnet of the base senor unit such that it can be removed from the bolt.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out their invention, Various modifications, however, will remain readily apparent to those skilled in the art, since the general principles of the present invention have been defined herein to specifically provide an improved ultrasonic transducer.

Figure 1:
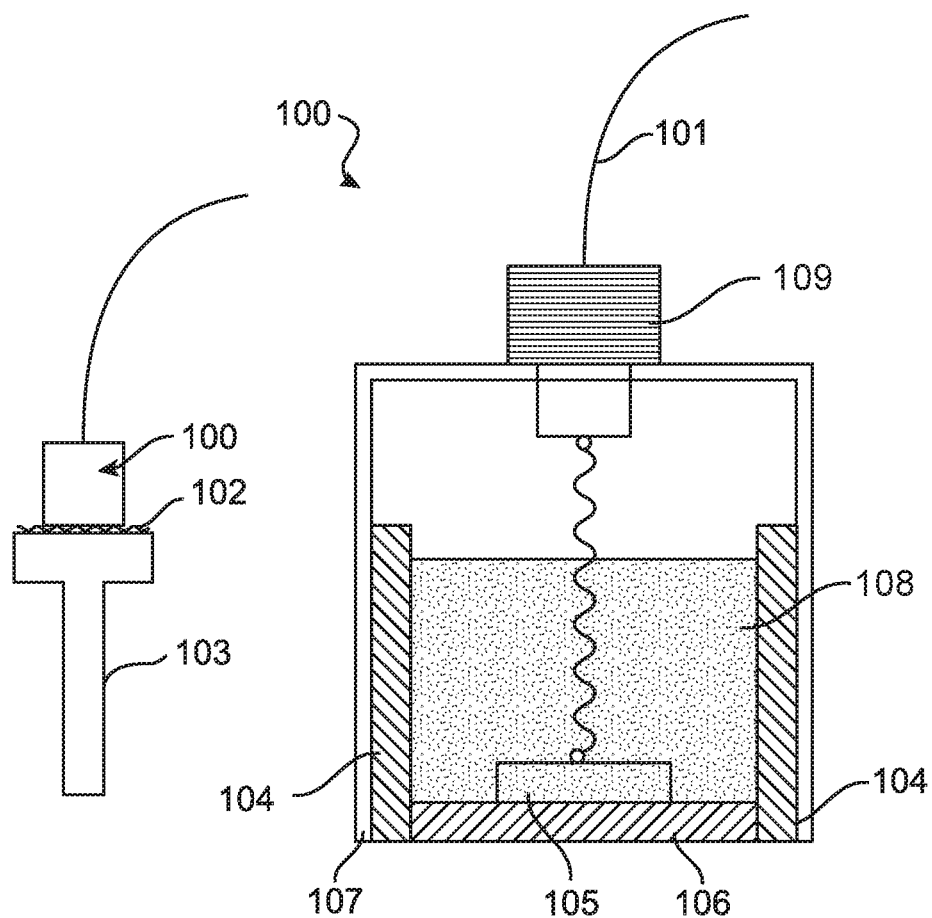
FIG. 1 is a conventional ultrasonic transducer of the prior art.

FIG. 1 is a conventional ultrasonic transducer 100 of the prior art. The transducer is used to measure the load on bolt 103, and comprises a casing 107, magnet 104, wearplate 106, piezo 105, backing material 108, connector 109 and wire 101. Utilizing couplant glycerin gel, the transducer is coupled to the bolt for measurement as wellknown in the art.

Figure 2:
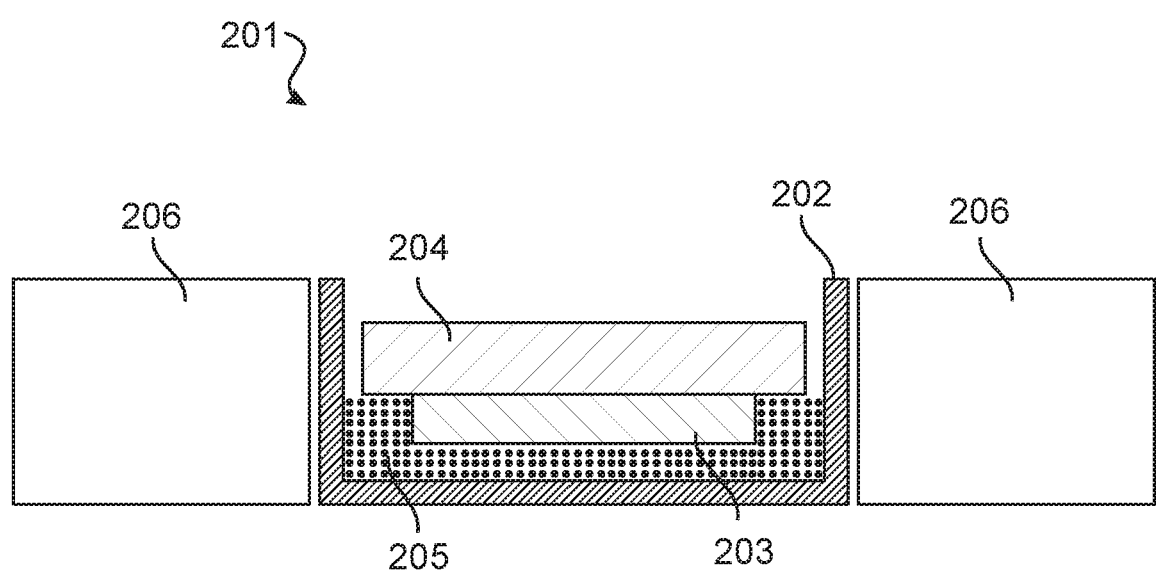
FIG. 2 is a base sensor unit of the improved ultrasonic transducer according to an embodiment of the present invention.

The improved ultrasonic transducer is broken up into two parts; a base sensor unit 201 and a signal pick up unit 301. Referring now to FIG. 2, the base sensor unit of the improved ultrasonic transducer is illustrated. In one embodiment, the base sensor unit comprises an aluminum cup 202, ceramic piezo 203, printed circuit board (PCB) 204, and a cylindrical magnet 206. The cylindrical magnet is configured to surround the aluminum cup. In one embodiment, the piezo is bonded to the aluminum cup via glue 205, wherein the glue causes ultrasonic waves to travel from the piezo to the aluminum cup during operation. Advantageously, the aluminum cup is used as a wear plate to protect the piezo. In one embodiment, the aluminum cup is installed inside the cylindrical magnet via press fit or adhesive, e.g. glue. Aluminum was selected for the cup due to aluminum's acoustic impedance property between the ceramic piezo and steel, allowing ultrasonic waves to pass from the piezo to steel and vice versa. However, in an alternative embodiment, silver fired alumina surrounded by a steel casing can be used instead of the aluminum cup.

Still referring to FIG. 2, the aluminum cup is configured to carry the ground signal from the bottom of the piezo to the surrounding cylindrical magnet. In alternative embodiments, the aluminum cup may be placed inside a steel cylinder (not shown). In one embodiment, the PCB is glued to the top of the ceramic piezo, wherein the PCB protects the piezo and conducts the top surface of the piezo to the top surface of the PCB such that the positive signal is carried from the top of piezo to the top surface of the PCB. In some embodiments, a temperature sensor is soldered on the circuit board for temperature measurement of bolt during operation.

Figure 3:
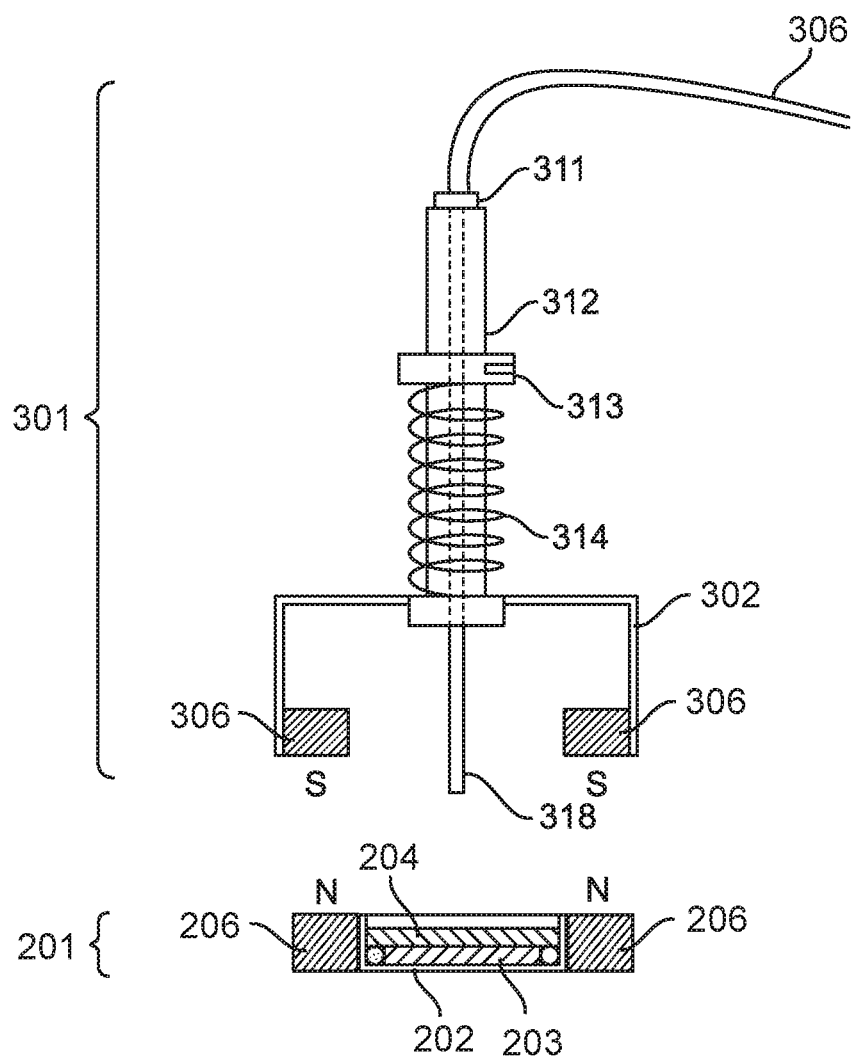
FIG. 3 illustrates a signal pickup unit and the base sensor unit of the improved ultra transducer according to an embodiment of the present invention.

FIG. 3 illustrates a signal pickup unit 301 and the base sensor unit 201 of the unproved ultrasonic transducer according to an embodiment of the present invention. Referring now to FIG. 3, the sensor pickup unit comprises a second cylindrical magnet 306 inside a steel cylinder 302. The steel cylinder is configured to carry the ground signal. In one embodiment, a spring loaded probe 318, loaded via spring 314 is provided. The steel cylinder is pushed forward by the spring. The tension force of the spring may be adjusted by stop adjuster 313, wherein the stop adjuster is positioned on steel casing 312. A connector 311 is installed on the opposite end of the probe on a top portion of steel casing 312. This arrangement enables both the steel cylinder and probe to move together simultaneously conducting ground and positive signals to the connector.

Figure 4:
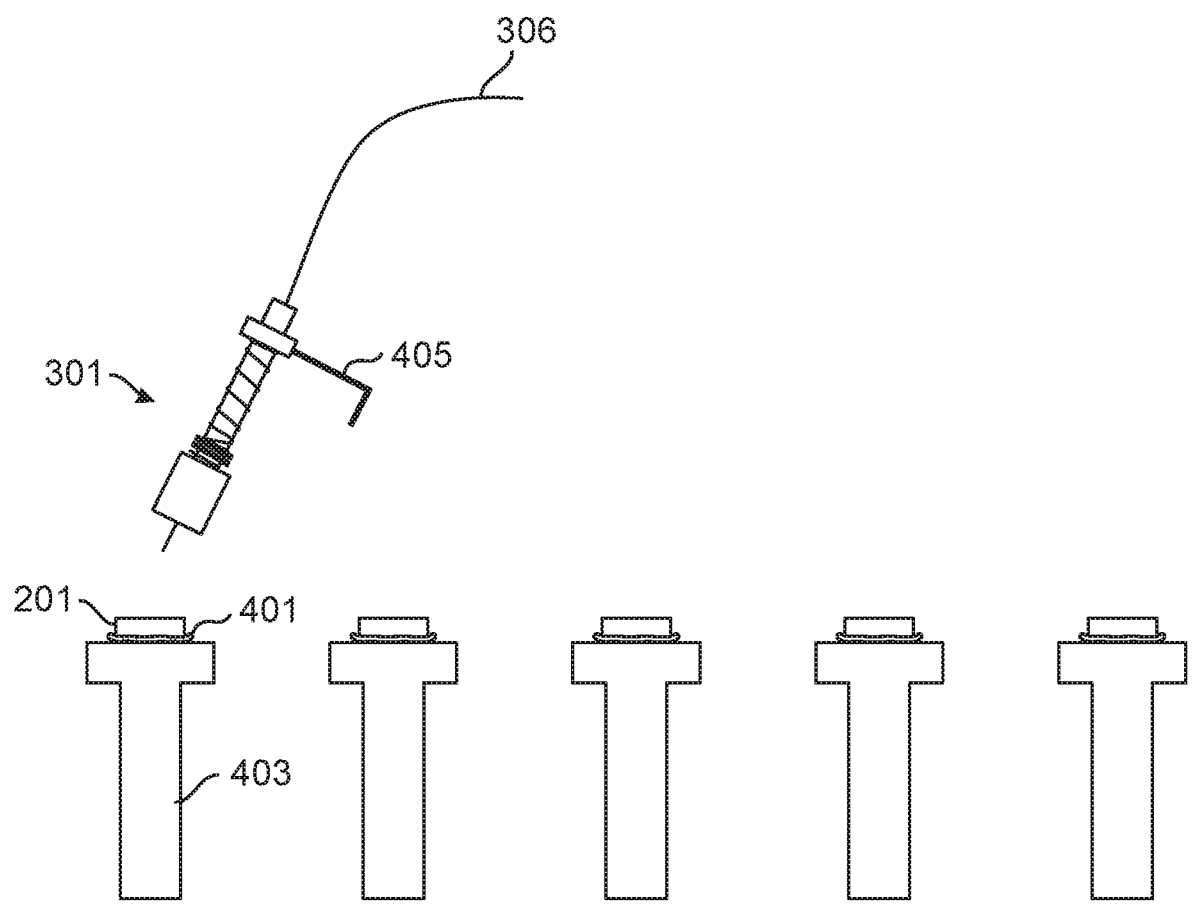
FIG. 4 illustrates a method of use for the improved ultrasonic transducer according to an embodiment of the present invention.

FIG. 4 illustrates a method of use for the improved ultrasonic transducer according to an embodiment of the present invention. Referring now to FIG. 4, the base sensor unit 201 is attached to bolt 403 using a couplant 401. In the preferred embodiment, the couplant is honey. The strong magnet (206; FIG. 2-3) of the base sensor unit attracts to the top surface of the bolt while the honey couplant acts like an adhesive. The magnet size may vary, and should be selected as to fit snugly on the top surface of the bolt. Proper sizing will prevent the magnet from moving around on the top surface of the bolt. The honey couplant enables ultrasonic waves to travel between the ultrasonic transducer and the bolt. The couplant is required for operation, as without the couplant the ultrasonic waves will not transfer between the transducer and the bolt. Honey is an ideal couplant since it is sticky, viscus, and washable. Honey also does not dry up easily, enabling the base sensor unit to stay on the bolt for a number of days without degradation. This enables the base sensor unit to be washed and reused which will be discussed in further detail below. Advantageously, during operation, the signal pickup unit and base sensor unit are self-aligning due to the opposing magnets, making it easy in a production environment to attach the signal pickup unit to base sensor units. Further, the pickup unit can be easily removed from the base unit by pushing the pickup unit towards any side of the cylindrical base unit due to the long probe. In one embodiment, a wrench 405 is used to adjust the spring tension in the pickup unit. In one embodiment, the pickup unit is placed inside a socket attached to a square drive wrench. Stopper 313 allows for adjustment of length of probe inside the socket.

In one embodiment, a method of use for the present invention for a plurality of bolts arranged in a tray includes steps: (a) placing a drop of honey on the top of each bolt of the plurality of bolts; (b) placing a plurality of base sensor units on the plurality of bolts; (c) placing a signal pickup unit on a base sensor unit of the plurality of base sensor units to measure a zero reference of a first bolt; (d) removing the signal pickup unit from the base sensor unit; (e) tightening the first bolt with a tool; (f) removing the tool; (g) replacing the signal pickup unit on the base sensor unit to measure a load on the first bolt; (h) removing the signal pickup unit from the base sensor unit; (i) removing the base sensor unit from the bolt; and (j) washing the base sensor unit such that it can be reused. In one embodiment, a strong magnet is used in step (i) to attract to the magnet of the base senor unit such that it can be removed from the bolt.

Ideally, the bolts are manufactured to have a flat top portion and end. In some embodiments, IDs are indented on the top portions of the bolts. Grinding of the bolt ends is not necessary.

Figure 5:
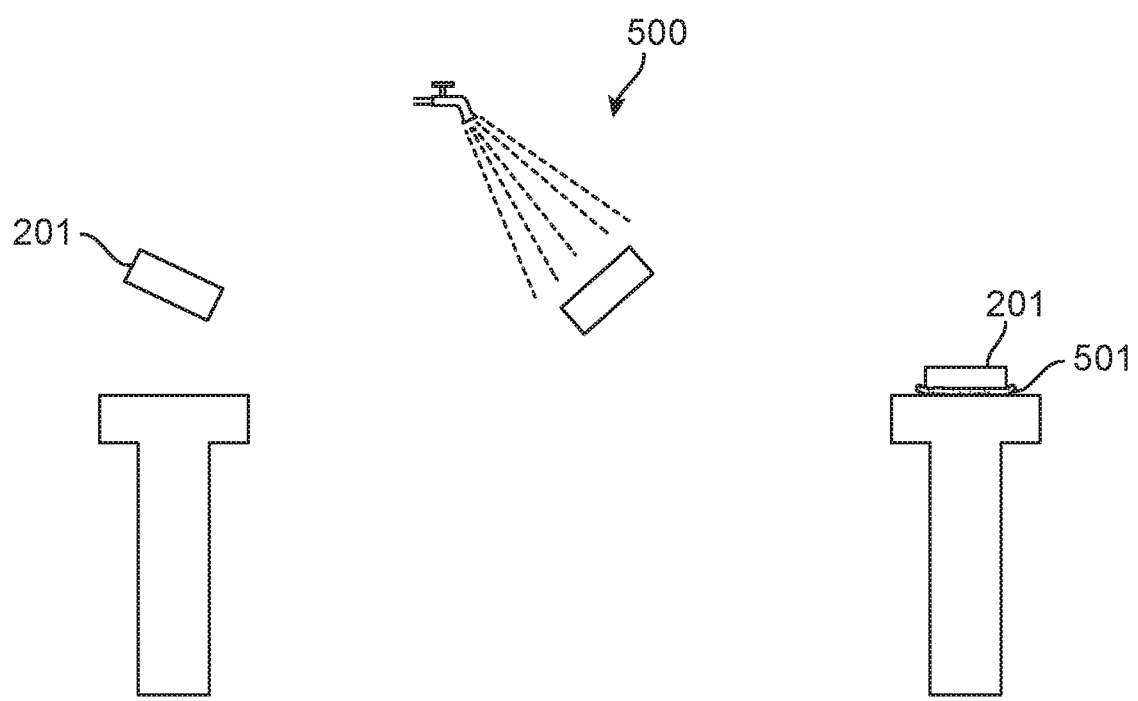
FIG. 5 illustrates a method for reusing the improved ultrasonic transducer according to an embodiment of the present invention.

FIG. 5 illustrates a method for reusing the improved ultrasonic transducer according to an embodiment of the present invention. Referring now to FIG. 5, as previously discussed, it is a particular advantage of the present invention to be able to reuse the base sensor unit as illustrated. Base sensor unit 201 is removed from the bolt, washed 500, such that it can be reused on another bolt with couplant 501. The washing techniques can be any washing techniques known in the art Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention. For instance, in one embodiment the signal pick up probe may be used inside a socket which passes through the square drive of a hand held or automatic wrench. In this manner removing of the probe before tightening is not necessary. Tightening operation of a bolt will happen normally. On first contact measuring device will automatically record the zero load before tightening. During tightening measuring device will read the ultrasonic signals from bolt therefore can control the applied load to the bolt in real time. In another variation, in one embodiment, a brass ball inside a plastic spacer can be used instead of the circuit board.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. An improved ultrasonic transducer comprising:
a base sensor unit includes a piezo ceramic sensor and a printed circuit board enclosed in a nonmagnetic housing, wherein the nonmagnetic housing is surrounded by a first cylindrical magnet;
a signal pickup unit includes a cylinder having a distal end and a proximal end, a cylindrical casing attached to the proximal end, a spring loaded probe surrounded by a second cylindrical magnet, wherein the spring loaded probe and the second cylindrical magnet are protected by the cylindrical casing, and the signal pickup unit is removable from the base sensor unit; and,
wherein the base sensor unit is configured to be removably attached to a bolt via a couplant and the signal pickup unit is configured to measure a load on the bolt when the first and second cylindrical magnets are magnetically attached and the spring-loaded probe engages the nonmagnetic housing.

2. The improved ultrasonic transducer of claim 1, wherein the nonmagnetic housing is constructed from aluminum.

3. The improved ultrasonic transducer of claim 1, wherein the cylinder is constructed from steel.

4. The improved ultrasonic transducer of claim 1, wherein the printed circuit board including a temperature sensor.

5. The improved ultrasonic transducer of claim 1, wherein the couplant is honey.

6. A method for measuring loads a plurality of bolts, comprising steps:
(a) providing an ultrasonic transducer having a base sensor unit and a pickup sensor unit;
(b) placing a drop of honey on a top surface of each bolt of the plurality of bolts;
(c) placing a plurality of base sensor units on the plurality of bolts;
(d) placing the signal pickup sensor unit on a first base sensor unit of the plurality of base sensor units to measure a zero reference of a first bolt of the plurality of bolts;
(e) removing the pickup sensor unit from the first base sensor unit;
(f) tightening the first bold with a tool;
(g) replacing the pickup sensor unit on the first base sensor unit to measure a load on the first bolt;
(i) removing the pickup sensor unit from the first base sensor unit; and
(j) removing the first base sensor unit from the bolt.

7. The method of claim 6, further comprising a step (k) washing the first base sensor unit such that it is configured to be reused.

8. The method of claim 6, wherein in step (j), a strong magnet is used to remove the first base sensor unit from the first bolt.

9. The method of claim 6, further comprising a step (l) repeating steps (d)-(j) for a second bolt using a second base sensor unit.

* * * * *